United States Patent [19]

Whited

[11] Patent Number: 4,559,485
[45] Date of Patent: Dec. 17, 1985

[54] CONTROL SYSTEMS FOR AC INDUCTION MOTORS

[75] Inventor: James S. Whited, Radford, Va. Conn.

[73] Assignee: Kollmorgen Technologies Corporation, Dallas, Tex.

[21] Appl. No.: 297,809

[22] Filed: Aug. 31, 1981

[51] Int. Cl.[4] .............................................. H02P 5/34
[52] U.S. Cl. .................................... 318/802; 318/811
[58] Field of Search ................................ 318/798–803, 318/805–811

[56] References Cited

U.S. PATENT DOCUMENTS

| | | | |
|---|---|---|---|
| 3,644,721 | 2/1972 | Preiser | 318/801 X |
| 3,899,725 | 8/1975 | Plunkett | 318/811 X |
| 3,962,614 | 6/1976 | Rettig | 318/801 |
| 4,099,107 | 7/1978 | Eder | 318/802 |
| 4,099,109 | 7/1978 | Abbondanti | 318/811 |
| 4,227,137 | 10/1980 | Hartman | 318/810 X |
| 4,267,499 | 5/1981 | Kurosawa | 318/800 |
| 4,322,671 | 3/1982 | Kawada | 318/811 X |
| 4,356,544 | 10/1982 | Ono | 318/811 X |
| 4,392,100 | 7/1983 | Stanton | 318/803 |

FOREIGN PATENT DOCUMENTS 0086726 7/1979 Japan .
0097726 8/1979 Japan .

OTHER PUBLICATIONS

Standard Transistorized Inverter—Tosvert-100 Series, Toshiba.

Primary Examiner—William M. Shoop, Jr.
Assistant Examiner—Patrick C. Keane
Attorney, Agent, or Firm—Morgan, Finnegan, Pine, Foley & Lee

[57] ABSTRACT

An AC induction motor control system wherein two pulse trains are generated, one pulse train including a pulse for each increment of rotor movement, and the other pulse train having pulses occurring at a rate proportional to slip. The pulse trains are combined in a counter which controls formation of synthesized winding excitations developed from pre-recorded sine values. The slip pulse train is developed according to pre-recorded slip factors selected as a function of rotor speed and modified in accordance with desired torque.

5 Claims, 3 Drawing Figures

CONTROL SYSTEMS FOR AC INDUCTION MOTORS

BACKGROUND OF THE INVENTION

This invention relates to electric motor control systems, and more particularly, to systems for controlling AC induction motors over a broad range of speeds and conditions.

In applications where variable speed electric motors are required, it has generally been the practice to utilize DC motors because of the ability to accurately control such motors over a broad range of speeds and conditions. In DC motors the winding current controls the motor torque and can be directly measured to achieve accurate control and the desired operation.

In an AC induction motor the torque is a function of induced current in the rotor which in turn is a function of slip, i.e., the difference in speed between the rotor and the rotating magnetic field produced by the stator. The speed of the rotating magnetic field is determined by the frequency of the winding energizing current. However, due to the slip, the rotor speed will differ therefrom by a variable amount related to the torque demands on the motor. As a result, it is difficult to accurately control rotor speed of an AC induction motor under variable torque conditions. Thus, even though AC induction motors are considerably less expensive than DC motors, they are generally not used where accurate speed control is required.

An objective of this invention is to provide a motor control system capable of accurately controlling the speed of an AC induction motor over a broad range of speeds and torque conditions.

SUMMARY OF THE INVENTION

In the system according to the invention voltage sine waves are synthesized from sine values in Programmable Read Only Memories (PROM's). These voltages are pulse width modulated and converted to drive currents supplied to the motor windings. Current loops maintain the excitation currents proportional to the values of the synthesized voltage sine waves. The magnitudes of the voltage sine waves which determine the magnitudes of the excitation currents are controlled according to an error signal developed in a velocity servo loop which compares a feedback signal indicative of actual speed with a command signal indicative of desired speed.

In this system according to the invention a pulse train is developed wherein each pulse indicates a pre-determined increment of rotor movement. This pulse train is applied to a counter which produces a count indicating vector position for use as an address to the PROMs containing the sine values. The system thus far described would produce sine wave excitation synchronous with the rotation of the motor.

A second pulse train is developed to adjust for slip so that the speed of the rotating magnetic field will differ from the desired motor speed by the correct amount to produce the slip required to meet the torque demands. Another PROM having slip factor values pre-recorded therein provides selected slip factors as a function of rotor speed. The selected slip factors are then modified in accordance with the motor torque requirements as indicated by the velocity error. This produces the second pulse train which is added or subtracted in the counter relative to the first pulse train to derive the excitation vector position. This vector position is used as the address to the PROMs containing the sine values to synthesize the voltage sine waves mentioned above.

The result is incrementally synthesized voltage sine waves and corresponding excitation currents, having a frequency differing from the synchronous frequency by the slip frequency.

DETAILED DESCRIPTION

Figure 1A:
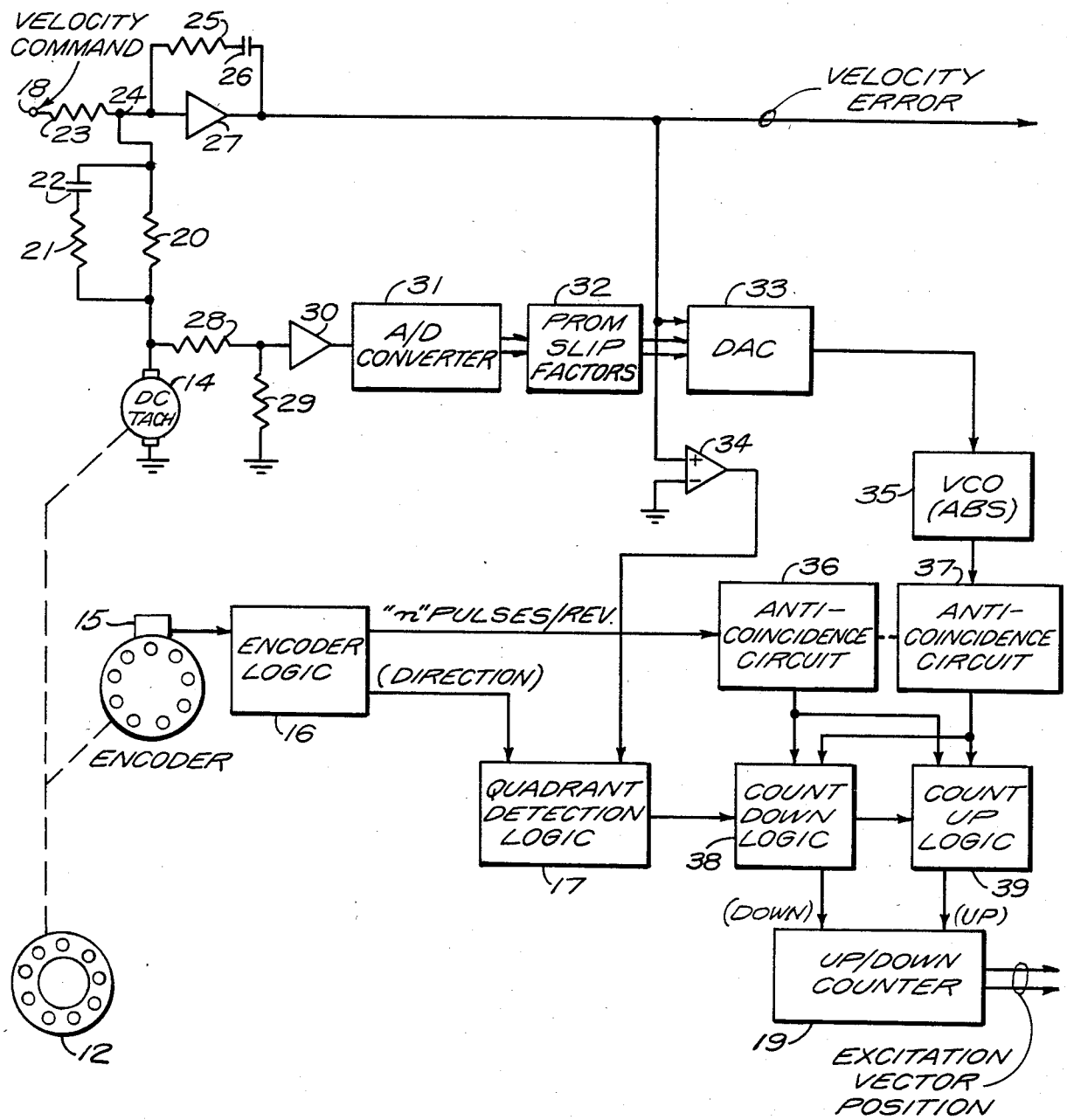
FIGS. 1A and 1B are a schematic block diagram illustrating the motor control system according to a prefered embodiment.
Figure 1B:
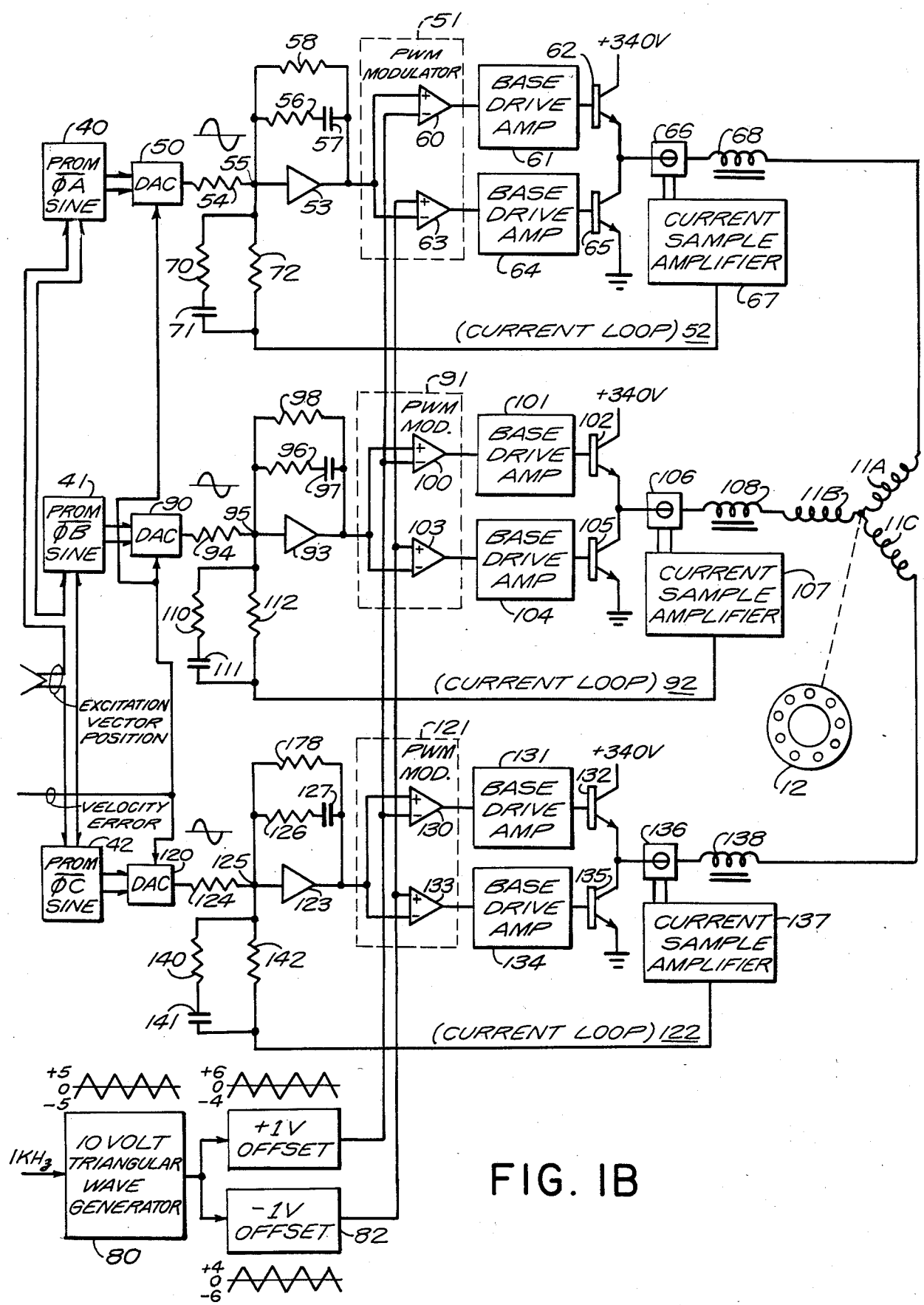

The overall schematic diagram for the motor control system according to a preferred embodiment of the invention is shown in FIGS. 1A and 1B. The motor being controlled is an AC induction motor shown to the right in FIG. 1B. The motor includes three stator windings 11A, 11B and 11C interconnected in a wye configuration and a four pole squirrel-cage induction rotor 12. The same rotor is also shown to the left in FIG. 1A mechanically coupled to a DC tachometer 14 and an encoder 15. The DC tachometer can be of conventional design to provide a DC voltage proportional to rotor speed with a polarity indicative of direction. The encoder provides pulses indicative of incremental rotor movements.

Each winding of the motor has a separate energization section (FIG. 1B) for generating a sinusoidal drive excitation of the correct amplitude and frequency. The amplitude of the excitation current is controlled in a velocity servo loop. The speed indication from tachometer 14 is compared with a velocity command signal at terminal 18 to provide a "velocity error" signal (upper portion of FIG. 1A). The frequency of the sinusoidal excitation is controlled by a pulse train developed from encoder 15 having "n" pulses per revolution and a second pulse train in accordance with prerecorded slip factors and the velocity error signal (center and lower portions of FIG. 1A). These pulse trains are combined to provide an "excitation vector position" indication which is used to synthesize the sinusoidal drive current.

The circuit for producing the velocity error signal includes an operational amplifier 27. One brush of DC tachometer 14 is connected to ground whereas the other brush is connected to the input of amplifier 27 at summing junction 24 via a lead network consisting of the series combination of resistor 21 and capacitor 22 in parallel with resistor 20. Terminal 18 receives the velocity command in the form of an analog voltage having an amplitude indicating desired motor speed and a polarity indicating desired direction. Terminal 18 is connected to the input of amplifier 27 via a resistor 23 and summing junction 24. A lead network consisting of resistor 25 in series with capacitor 26 is connected across amplifier 27. The lead networks including components 20-22 and 25-26 tend to anticipate rapid changes in the feedback loop and reduce overshoot and ringing.

The tachometer acts as a feedback element providing a continuous indication of the actual motor speed and direction. Amplifier 27 and the related components form a summing circuit which sums the actual speed and direction signal from the tachometer with the desired speed and direction as indicated by the command signal at terminal 18 to produce the difference at the output of the amplifier 27 which is referred to as the "velocity error" signal. As will be explained later, the velocity error signal controls the amplitude of the motor excitation current. The speed of the motor is automatically adjusted in servo loop fashion until the actual motor speed is essentially the same as the desired speed indicated by the velocity command.

Encoder 15 is of conventional design and is connected to an encoder logic circuit 16 that produces a base pulse train, with "n" pulses per revolution of the motor, and a direction indication indicating the direction of the motor rotation. As will be explained later, the sinusoidal excitation currents are synthesized from pre-recorded values in a read only memory which conventionally uses an 8 bit address and therefore records 256 values. Since, as previously mentioned, the motor is a four pole motor, 180 mechanical degrees is equal to 360 electrical degrees and therefore the base pulse train should include 512 pulses per revolution. In general, "n" is equal to 256 times the number of pole pairs.

If the base pulse train were used directly to control the drive circuits, the drive circuits would produce excitation current synchronous with the rotor movement. To adjust the excitation frequency for the induction motor, a slip pulse train is generated utilizing slip factors recorded in programmable read only memory (PROM) 32.

More specifically, resistors 28 and 29 form a voltage divider across DC tachometer 14 to scale the tachometer output for application to a buffer amplifier 30. The output of amplifier 30 is supplied to a analog to digital converter 31 which in turn supplies a digital output to PROM 32. The output of converter 31 is an 8 bit word indicating motor speed and is used as the address for PROM 32. Thus, the output of PROM 32 is a slip factor selected as a function of motor speed.

The digital output from PROM 32 is supplied to a digital to analog converter 33 which converts the digital indication into a corresponding voltage. Converter 33 is of the type capable of multiplying the output by another analog signal which, in this case, is supplied from the output of amplifier 27. Therefore, the output of converter 33 represents the selected slip factor multiplied by the velocity error. This output from converter 33 is supplied to a voltage controlled oscillator 35 which produces a slip pulse train having a repetition rate proportional to the absolute value of the applied voltage.

The two pulse trains, i.e., the base pulse train developed from encoder 15 and the slip pulse train developed by oscillator 35, are supplied to a counter 19 which produces the "excitation vector position" indication. More specifically, the base pulse train from encoder 15 and logic 16 passes through an anti-coincidence circuit 36 into a count down logic circuit 38 and a count up logic circuit 39. The logic circuits contain suitable gates controlled by a quadrant detection logic circuit 17 which channels the base pulse train into either the "down" count input of counter 19 or into the "up" count input of the counter. Similarly, the slip pulse train from oscillator 35 passes through an anti-coincidence circuit 37 into count down logic circuit 38 and count up logic circuit 39. The logic circuits likewise channel the slip pulse train into one or the other of the counter inputs.

Anti-coincidence circuits 36 and 37 are interconnected as indicated by the dotted line connection in FIG. 1A. These circuits function to make sure that pulses are not lost when pulses arrive simultaneously in both pulse trains. The anti-coincidence circuits alternately pass applied pulses so that the pulse from one pulse train, if present, will pass and then a pulse from the other pulse train, if present, will pass. In this manner, the loss of pulses is prevented when the pulses occur simultaneously.

The count down and count up logic circuits are controlled by quadrant detection logic circuit 17, which receives a signal from encoder 16 indicating the actual direction of rotor movement and also receives a signal derived from the velocity error which indicates the desired torque direction. The velocity error indicates the quantity and direction of the torque required for the motor. The output of amplifier 27 is supplied to the plus input of a comparator 34, the minus input being connected to ground. The output of comparator 34 is connected to the quadrant detection logic circuit 17 and supplies a logic signal indicating the polarity of the velocity error which is the direction of the desired torque.

A truth table for the direction information and the resulting paths for the slip pulse train and the base train is as follows:

| Motor Direction | Torque Direction | Slip Pulses | Base Pulses |
|---|---|---|---|
| 1 | 1 | Up Count | Up Count |
| 0 | 0 | Down Count | Down Count |
| 0 | 1 | Up Count | Down Count |
| 1 | 0 | Down Count | Up Count |

If the rotor direction and the torque direction both correspond to a logic 1 (first line of table), then the slip pulse train from oscillator 35 and the base pulse train from encoder 15 both pass through count up logic circuit 39 to the "up" count input of counter 19. If the motor rotation and the torque direction both correspond to a logic 0 (second line of the table), then both pulse trains pass through the count down logic circuit 38 into the "down" input of counter 19. Thus, if the actual motor direction is the same as the desired torque direction, the pulse trains add (i.e., cause the counter to count in the same direction) and, hence, the counter passes through a complete cycle (256 bits) faster than if only the base pulse train had been applied.

If the motor rotation corresponds to a logic 0 and the torque direction corresponds to a logic 1 (third line of the table), then the slip pulse train passes through count up logic circuit 39 into the "up" counter input while the base pulse train passes through count down logic 38 into the "down" counter input. Similarly, if the motor direction corresponds to logic 1 and the torque direction corresponds to logic 0 (last line in table), the slip pulse train passes through to the "down" counter input whereas the base pulse train passes through the "up" counter input. When the actual motor direction is different from the desired torque direction (as can occur during a speed change or a direction change) the pulse trains subtract from one another and the count cycle of the counter is slower than if only the base pulse train were applied.

The output of counter 19 is an 8 bit word indicating the "excitation vector position" and is used to control the sinusoidal excitation current synthesized in the drive circuitry shown in FIG. 1B.

The drive circuits shown in FIG. 1B provide the excitation currents for windings 11A, 11B and 11C which are sinusoidal and displaced from one another by 120 electrical degrees. The frequency is determined by the "excitation vector position" indication and the amplitude is determined by the "velocity error".

The excitation vector indication is converted into sine wave indication by programmable read only memories (PROM's) 40, 41, and 42 which are programmed to receive vector position values as addresses and to produce corresponding sine values. The PROM's are programmed so that in response to any particular vector indication they produce sine values displaced from one another by 120 electrical degrees.

The digital output indications from PROMs 40, 41 and 42 are supplied, respectively, to digital to analog converters (DACs) 50, 90 and 120 which convert the digital values stored in the PROMs into analog values, i.e., sine waves. DACs 50, 90 and 120 are of the analog multiplying type capable of multiplying the output with another analog signal. The velocity error signal (from amplifier 27 FIG. 1A) is supplied to the DACs and controls the amplitude of the sine wave signals produced.

The result appearing at the outputs of DACs 50, 90 and 120 is three incrementally synthesized sine wave voltage signals displaced from one another by 120 electrical degrees, having a frequency differing from the synchronous frequency by the amount of the slip and having an amplitude controlled by velocity error in the velocity servo loop.

The sinusoidal voltage signal appearing at the output of DAC 50 is supplied to a pulse width modulator 51 which provides pulse width current excitation to winding 11A of the motor. The quantity of current supplied to the winding is proportional to the applied voltage and is controlled by current loop 52.

The output of DAC 50 is connected to the input of an operational amplifier 53 via a resistor 54 and a summing junction 55. A lead network consisting of the series combination of resistor 56 and capacitor 57 in parallel with a resistor 58 is connected across the operation amplifier. The amplifier output is connected to the negative input terminal of a comparator 60 and to the positive input terminal of a comparator 63. The output of comparator 60 is coupled to the base of a transistor 62 via a base drive amplifier 61. The output of comparator 63 as coupled to the base of transistor 65 via a base drive amplifier 64.

Transistors 62 and 65 are both NPN power switching transistors selected to handle the current requirements for the motor being controlled. The collector of transistor 62 is connected to the +340 volt supply buss, while the emitter thereof is connected to winding 11A through an inductor 68. The collector of transistor 65 is also connected to winding 11A through inductor 68 while the emitter of transistor 65 is connected to ground. Thus, when transistor 62 is conductive, winding 11A is connected to the positive supply buss whereas when transistor 65 is conductive, the winding is connected to ground. The inductor in series with the motor winding decreases ripple currents and associated motor heating.

The common lead from transistors 62 and 65 to inductor 68 passes through a ferrite core 66 having a linear Hall effect detector located to sense the magnetic flux in the core. The Hall detector is connected to a current sample amplifier 67. As current passes through the conductor, it creates a magnetic flux in core 66 which is sensed by the Hall detector connected to amplifier 67 which in turn produces a voltage output proportional to the current passing through the lead.

The output of amplifier 67 provides the feedback to summing junction 55 to complete the current control loop. More specifically, the output of amplifier 67 is connected to summing junction 55 via a lead network, including the series combination of resistor 70 and capacitor 71 in parallel with a resistor 72. The lead networks 70–72 and 56–58 tend to anticipate rapid signal changes and reduce overshoot and ringing in the control loop. The current loop is an inner control loop within the velocity control loop and the vector control loop and therefore the current loop is preferably designed with a relatively broad band characteristic to provide a more rapid control response.

The pulse width modulator (PWM) 51 which includes comparators 60 and 63 receives triangular wave signals originating from a triangular wave generator 80. The triangular wave has a suitably high repetition rate like 1 KHz and has a peak-to-peak range from +5 volts to −5 volts. The triangular wave from generator 80 is offset by +1 volt in an offset circuit 81 to provide a triangular wave having a peak-to-peak range of +6 volts to −4 volts which is supplied to the negative input terminal of comparator 63. The triangular wave from generator 80 also passes through −1 volt offset circuit 82 to provide a triangular wave with peak-to-peak values ranging from +4 volts to −6 volts supplied to the positive input terminal of comparator 60.

Figure 2:
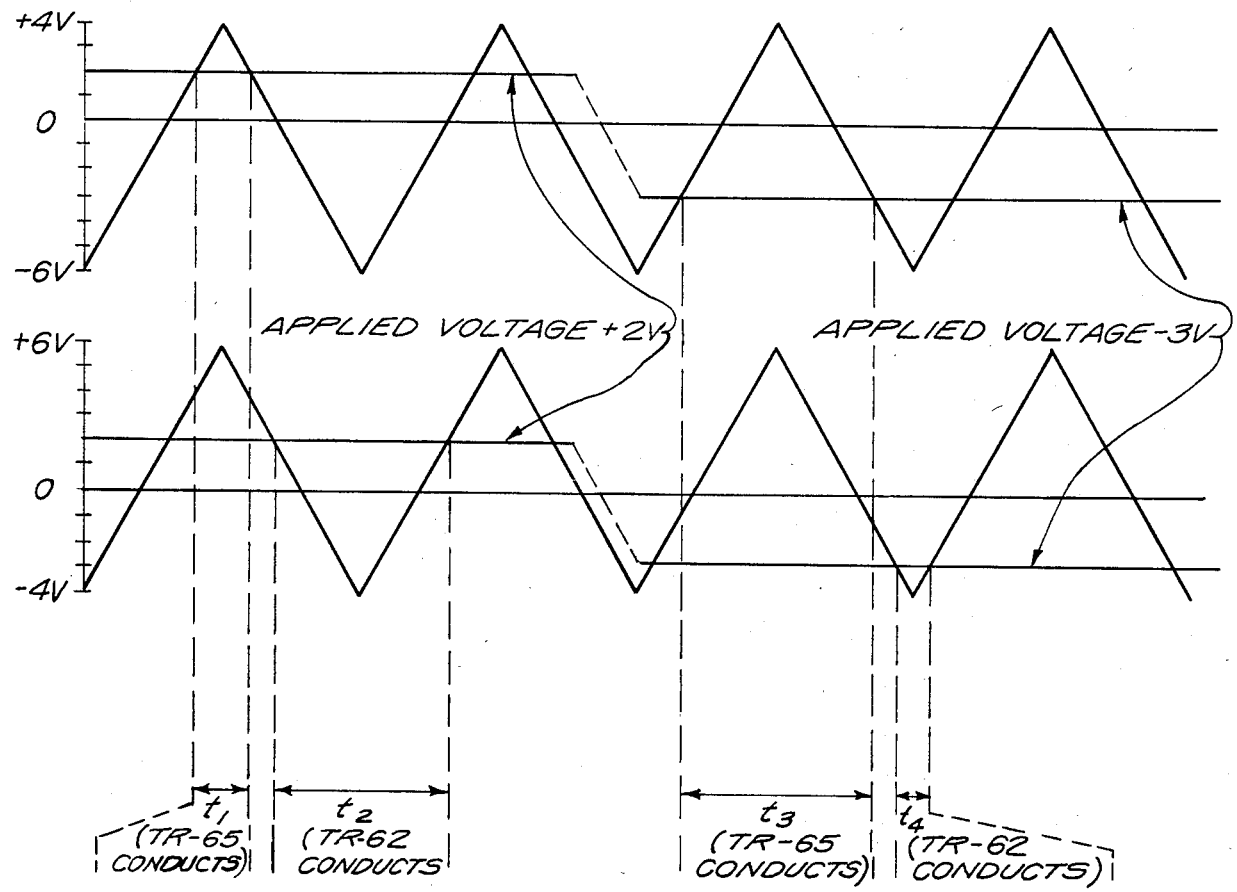
FIG. 2 is a timing diagram illustrating the pulse width modulation technique used in FIG. 1B.

The operation of the pulse width modulator is illustrated in FIG. 2 showing the two offset triangular waves applied to comparators 60 and 63. If the applied signal (output of amplifier 53 in FIG. 1B) has a +2 volts value, for example as shown to the left in FIG. 2, comparator 63 produces a logic 1 signal for the interval $t_1$ during which the applied signal is more negative than the triangular wave. Transistor 65 is therefore conductive during interval $t_1$. During the remainder of the triangular wave cycle the comparator produces a logic 0 output and therefore transistor 65 is nonconductive. Comparator 60, on the other hand, produces a logic 1 signal during $t_2$ when the applied signal is more positive than the triangular wave to thereby render transistor 62 conductive. During the remainder of the cycle transistor 62 is nonconductive since the applied voltage is more positive than the triangular wave signal.

Another example is shown to the right in FIG. 2 where the applied signal has a value of −3 volts. Under these circumstances, comparator 63 produces a logic 1 output to render transistor 65 conductive during interval $t_3$ whereas comparator 60 produces a logic 1 signal during interval $t_4$ during which time transistor 62 is rendered conductive.

Thus, it can be seen that as the applied signal becomes increasingly positive transistor 62, which connects the winding to the positive source, becomes conductive for increasingly longer portions of each operating cycle whereas transistor 65, which connects the winding to ground, becomes conductive for increasingly shorter intervals. Accordingly, increasingly positive applied voltages cause increasingly larger currents to flow through the winding. On the other hand, as the applied signal becomes increasingly negative, the conductive period for transistor 65 increases and the conductive period for transistor 62 decreases. Accordingly, the winding is connected to ground for increasingly longer periods of time and, therefore, the current flow through the winding decreases.

It should be noted in FIG. 2 that an interval always exists between the times when the two transistors are conductive. This interval is as a result of the voltage offsets provided by circuits 81 and 82. The interval provides a short dead space to insure that both transistors never become conductive simultaneously to short circuit the power supply.

The current supplied to the winding is controlled by current loop 52 so that the current is proportional to the applied potential appearing at the output of DAC 50. As the output of DAC 50 increases, the output of amplifier 53 tends to increase thereby increasing the conductive interval for transistor 62 and the current supplied to the winding. The increase in current is detected by amplifier 67 which provides an increased feedback signal to amplifier 53 to limit the increase to the value indicated by the applied potential.

Similarly, components 91–112 form a current control loop that applies current to winding 11B proportional to the synthesized sinusoidal voltage appearing at the output of DAC 90 and components 121–142 form a current control loop that applies current to winding 11C proportional to the synthesized sinusoidal voltage appearing at the output of DAC 120.

The three phase drive currents when applied to the winding create a rotating magnetic which rotates at a speed different from the rotor speed by the amount of slip required to produce the desired torque. This difference in speed is dependent on the slip factor programmed into PROM 32 (FIG. 1A). These slip factors are preferably determined empherically by determining the numerical factors at each speed that produce the greatest torque. This can be done by maintaining the motor at a constant speed while changing the numerical values applied to DAC 33 until the value corresponding to the maximum torque is found.

If, for example, voltage controlled oscillator 35 produces the maximum desired slip frequency for the maximum motor speed in response to a 10 volt signal and the maximum velocity error signal is 10 volts, then the slip factor in PROM 32 corresponding to the maximum speed should be 1.000. A typical corresponding value for zero speed would be 0.200. The values between these extremes can change linearly with speed to achieve the desired control results.

While only one illustrative embodiment has been described in detail, it should be obvious that there are other embodiments within the scope of this invention.

The invention is more particularly defined in the appended claims.

I claim:

1. A velocity motor control system for an AC induction motor comprising:
    a motor including
        multiphase stator windings, and
        an induction rotor;
    means coupled to said rotor to produce a base pulse train including a predetermined number of pulses per revolution of said rotor;
    a slip factor generator;
    means coupled to said rotor and operatively connected to said slip factor generator to provide slip factors as a function of the speed of said rotor;
    means connected to said slip factor generator and operative to modify slip factors in accordance with the desired motor torque;
    means for producing a slip pulse train in accordance with the modified slip factor;
    a counter responsive to said base train and said slip pulse train operatively connected to count pulses from both of said trains; and
    drive circuit means, having a voltage source interter, connected to said stator windings, said drive circuit being connected to said counter and being operative to synthesize sinusoidal excitation currents in accordance with the count on said counter.

2. A motor control system in accordance with claim 1, wherein said slip factors recorded in said memory represent the slip values corresponding to maximum torque for the selected motor speeds.

3. A motor control system in accordance with claim 1 further comprising:
    a velocity servo loop including
        means for comparing a command indication of desired speed with an indication of actual motor speed to derive a velocity error signal,
        using said error signal as an indication of desired torque to modify said selected slip factor, and
        using said error signal to control the magnitude of said synthesized excitation currents developed by said drive circuit means.

4. A motor control system in accordance with claim 1 wherein said drive circuit means includes memories having prerecorded sine values therein and wherein sine values are selected in accordance with the count on said counter to synthesize sinusoidal excitation commands.

5. A motor control system in accordance with claim 1 wherein said slip factor generator includes a memory having slip factors prerecorded therein.

* * * * *